United States Patent
Yamamoto et al.

(10) Patent No.: US 8,155,242 B2
(45) Date of Patent: Apr. 10, 2012

(54) FREQUENCY SHIFT KEYING (FSK) DIGITAL SIGNAL RECEIVING APPARATUS

(75) Inventors: Tomohiro Yamamoto, Anjo (JP); Akira Furuhashi, Takahama (JP); Takahiro Horie, Nagoya (JP); Yuichi Murakami, Chiryu (JP); Kazunori Ono, Tokai (JP); Frederic Coutant, Grasse (FR); Tarik Aouine, Valbonne (FR)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 665 days.

(21) Appl. No.: 12/270,416

(22) Filed: Nov. 13, 2008

(65) Prior Publication Data

US 2009/0129510 A1    May 21, 2009

(30) Foreign Application Priority Data

Nov. 15, 2007  (EP) ..................... 07120787

(51) Int. Cl.
    *H03D 3/00* (2006.01)
(52) U.S. Cl. ....................................................... 375/334
(58) Field of Classification Search .................. 375/334, 375/346, 350; 455/161.3, 296, 307, 343.1
    See application file for complete search history.

(56) References Cited

U.S. PATENT DOCUMENTS

| 2004/0229590 A1* | 11/2004 | Kubo et al. ................... 455/307 |
| 2007/0201588 A1* | 8/2007 | Loiseau et al. ................ 375/346 |

FOREIGN PATENT DOCUMENTS

| FR | 2 859 336 A1 | 3/2005 |
| JP | 2001-4736 A | 1/2001 |
| JP | 2005-45314 A | 2/2005 |

* cited by examiner

*Primary Examiner* — David C. Payne
*Assistant Examiner* — Leon-Viet Nguyen
(74) *Attorney, Agent, or Firm* — Sughrue Mion, PLLC

(57) ABSTRACT

A frequency shift keying digital signal receiving apparatus includes a detecting portion detecting a new signal on the basis of a signal, from which a correlated ambient noise is filtered out by an adaptive filter, a holding portion holding a first electric power for the signal received before a new signal is detected, a calculating portion calculating a second electric power for the signal received after the new signal is detected, a comparing portion comparing levels of the first and second electric powers, a selector selecting the signal, from which the correlated ambient noise is filtered out, when the first electric power is higher than the second electric power and selecting the signal bypassing the adaptive filter when the first electric power is lower than the second electric power, and a demodulating portion demodulating a desired signal on the basis of the signal selected by the selecting portion.

3 Claims, 3 Drawing Sheets

FIG. 2

FIG. 3
PRIOR ART ns of a first
FREQUENCY SHIFT KEYING (FSK) DIGITAL SIGNAL RECEIVING APPARATUS

CROSS REFERENCE TO RELATED APPLICATIONS

This application is based on and claims priority under 35 U.S.C §119 to European Patent Application No. 07120787.2 filed on Nov. 15, 2007, the entire content of which is incorporated herein by reference.

FIELD OF THE INVENTION

The present invention generally relates to a frequency shift keying (FSK) digital signal receiving apparatus.

BACKGROUND

Figure 3:
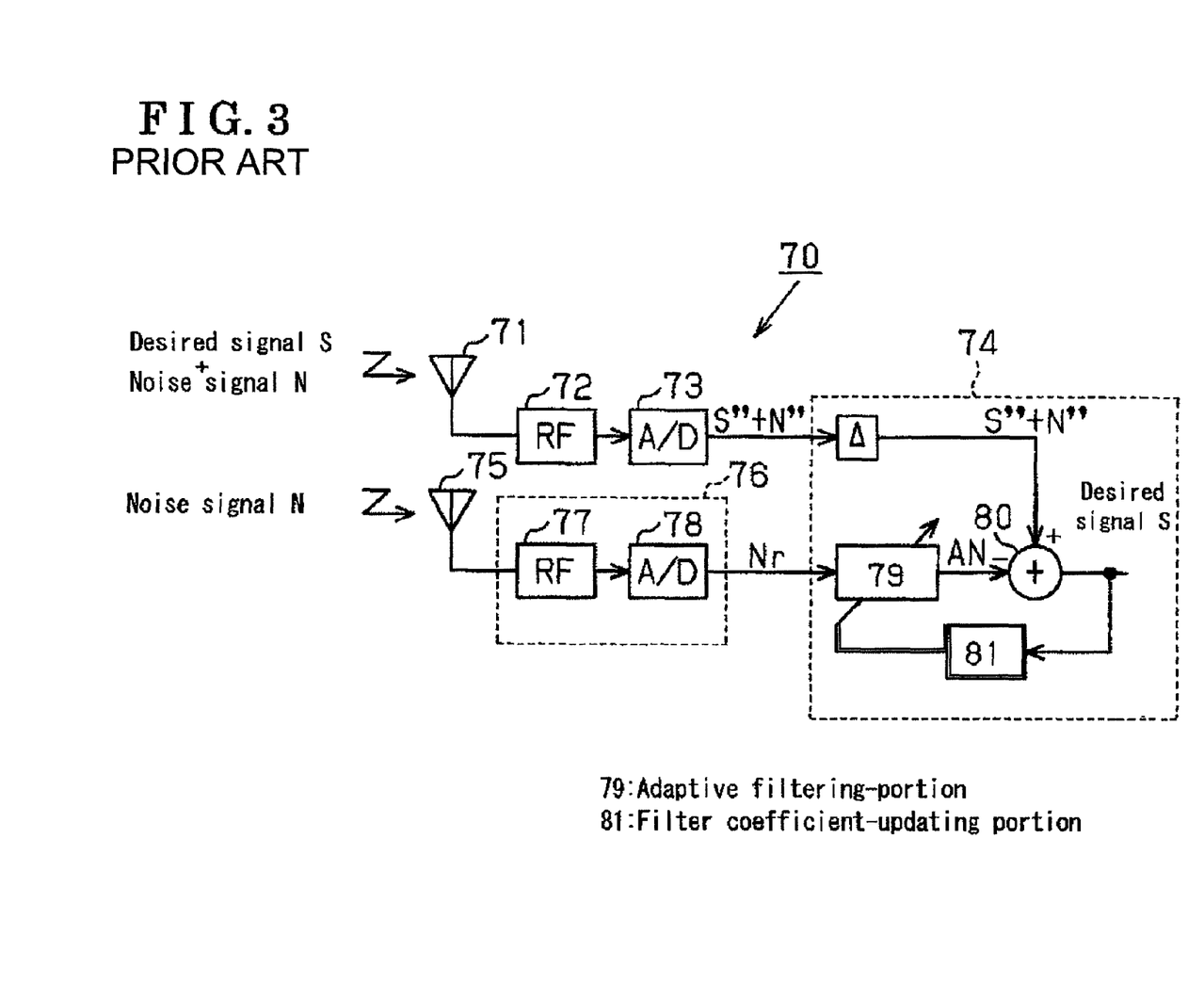
FIG. 3 is a block diagram illustrating an example of a known art.

A known digital signal receiving apparatus adapted to an FSK (Frequency Shift Keying) system is disclosed in Japanese Patent No. 2001-4736A (hereinafter, referred to as reference 1), for example. FIG. 3 is a block diagram illustrating a general configuration related to a digital signal receiving apparatus disclosed in the reference 1. As illustrated therein, the digital signal receiving apparatus, generally indicated at 70, receives a desired signal S combined with a noise signal N, which is correlated as an ambient noise, by means of a first antenna 71. Then, the digital signal receiving apparatus 70 down-converts the received signals to a desired high-frequency band at a high-frequency processing portion 72. Further then, the digital signal receiving apparatus 70 generates a corresponding digital signal (S"+N") by converting the signals from analog to digital in an A/D converting portion 73, and outputs the digital signal to a noise-filtering unit 74.

In addition, the digital signal receiving apparatus 70 receives the noise signal N by means of a second antenna 75. Then, the digital signal receiving apparatus 70 down-converts the received noise signal N to a desired frequency band at a high-frequency processing portion 77 of a reference noise signal-output portion 76. Further then, the digital signal receiving apparatus 70 generates a reference noise signal Nr, which is coherent with the noise signal N, by converting the signal N from analog to digital at an A/D converting portion 78, and outputs the digital signal to the noise-filtering unit 74.

The noise-filtering unit 74 generates a noise cancel signal AN via an adaptive filtering-portion 79 on the basis of the reference noise signal Nr, and filters the noise signal N by adding the digital signal (S"+N") inputted from the antenna 71 to the noise cancel signal AN at an adder 80. A filter coefficient of the adaptive filtering portion 79 is sequentially updated by a filter coefficient-updating portion 81 so that the noise signal N (N") is reduced to a minimum.

However, according to the digital signal receiving apparatus 70 of the reference 1, the second antenna 75 and the reference noise signal-output portion 76 (the high-frequency processing portion 77 and the A/D converting portion 78) are required for receiving the noise signal N, thus leads to an increase of a size of a circuit. In addition, certain ingenuity is required in order to prevent the desired signal S from being inputted to the second antenna 75. In other words, if the desired signal S is inputted to the second antenna 75, the desired signal S may be also generated as the noise cancel signal AN at the adaptive filtering portion 79 and the desired signal S may be filtered.

Then, another FSK digital signal receiving apparatus has been proposed in Japanese Patent No. 2005-45314A (hereinafter, referred to as reference 2). The FSK digital signal receiving apparatus according to the reference 2 includes an adaptive filter and filter controlling means. The adaptive filter includes an adaptive mode and a non-adaptive mode. In the adaptive mode, a filter coefficient is sequentially updated and an ambient noise is filtered at a signal-receiving standby state for receiving a desired signal. In the non-adaptive mode, an update of the filter coefficient is stopped at a signal-receiving state for receiving the desired signal. The filter controlling means controls switching to the adaptive mode and to the non-adaptive mode, of the adaptive filter. The adaptive filter includes an adaptive filter portion and a filter coefficient-updating portion. At the adaptive filter portion, the filter coefficient is changed in accordance with a change of the ambient noise at the signal-receiving standby state. The filter coefficient renewal portion sequentially renews the filter coefficient of the adaptive filter portion so as to reduce the ambient noise to a minimum. When a new signal is detected by detecting means at the signal-receiving standby state, the filter controlling means switches the mode of the adaptive filter from the adaptive mode to the non-adaptive mode and stops the update of the filter coefficient.

In such a case, at the signal-receiving standby state, the adaptive filter sequentially updates the filter coefficient and filters the ambient noise, reacting to the adaptive mode. On the other hand, at the signal-receiving state for receiving the desired signal, the adaptive filter stops renewing the filter coefficient reacting to the non-adaptive mode. In other words, at the non-adaptive mode, the adaptive filter filters the ambient noise utilizing the filtering coefficient updated for filtering the ambient noise at the adaptive mode. Accordingly, in the signal-receiving state for receiving the desired signal, even when the ambient signal and the desired signal have a correlation, the ambient signal is filtered by the adaptive filter and the desired signal is preferably received. In addition, even when the ambient signal and the desired signal have a correlation, the ambient signal and the desired signal can be selectively received because the filter controlling means controls the switching to the adaptive mode and the non-adaptive mode. Accordingly, the size of the circuit can be reduced in comparison with a configuration of the circuit in which the ambient signal and the desired signal are separately received.

However, according to the FSK digital signal receiving apparatus of the reference 2, when an interfering wave including a frequency being identical to that of the desired signal is combined, the desired signal may be approximately filtered because the filter coefficient is updated for filtering the ambient noise including the above-described frequency from the desired signal. Even when an electric power of the desired signal is larger than that of the interfering wave, the desired signal may be reduced to some extent by the adaptive filter and there is a possibility that the desired signal is not demodulated.

A need thus exists for an FSK digital signal receiving apparatus which can demodulate the desired signal more precisely.

SUMMARY OF THE INVENTION

According to an aspect of the present invention, a frequency shift keying (FSK) digital signal receiving apparatus includes an adaptive filter, a detecting portion, a holding portion, a calculating portion, a comparing portion, a selecting portion, and a demodulating portion. The adaptive filter receives a signal and includes an adaptive mode for filtering out a correlated ambient noise from the signal by use of a filter coefficient updated in a sequential manner. The detecting portion detects a new signal on the basis of the signal, from which the correlated ambient noise is filtered out by the adaptive filter. The holding portion holds a first electric power for the signal received before a detection of the new signal. The calculating portion calculates a second electric power for the signal received after the detection of the new signal. The comparing portion compares a level of the first electric power with a level of the second electric power. The selecting portion selects the signal, from which the correlated ambient noise is filtered out by the adaptive filter, when the first electric power is higher than the second electric power. The selecting portion selects the signal bypassing the adaptive filter when the first electric power is lower than the second electric power. The demodulating portion demodulates a desired signal on the basis of the signal selected by the selecting portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of the present invention will be described hereinafter with reference to attached drawings.

Figure 1:
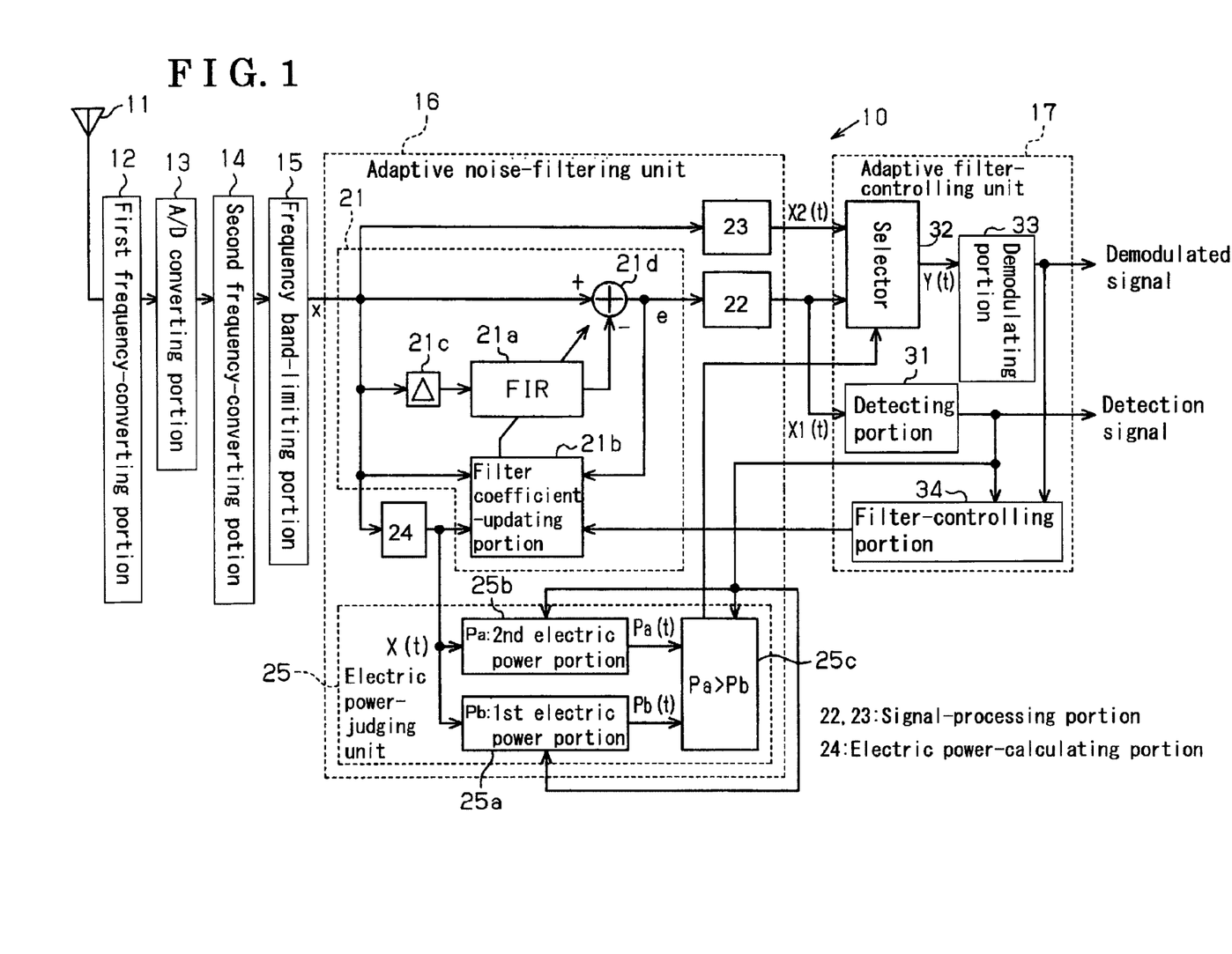
FIG. 1 is a system block diagram illustrating a frequency shift keying (FSK) digital signal receiving apparatus according to an embodiment of the present invention.

FIG. 1 is a system block diagram illustrating a system of a frequency shift keying (FSK) digital signal receiving apparatus 10. The FSK digital signal receiving apparatus 10 is configured to receive a signal, for example, transmitted from a transmitter carried by a user. Hereinafter, the signal from the transmitter will be referred to as a desired signal. The FSK digital signal receiving apparatus 10 is switched between operation modes, which are a signal-receiving state, in which the apparatus 10 receives the desired signal, and a signal-receiving standby state, in which the apparatus 10 is in a standby state for receiving the desired signal.

As illustrated in FIG. 1, the FSK digital signal receiving apparatus 10 incorporates therein an antenna 11, a first frequency-converting portion 12, an A/D converting portion 13, a second frequency-converting potion 14, a frequency band-limiting portion 15, an adaptive noise-filtering unit 16, and an adaptive filter-controlling unit 17.

The antenna 11 is basically structured to be inputted with the desired signal. When the operation mode of the FSK digital signal receiving apparatus 10 is in the signal-receiving state, the antenna 11 is inputted with an ambient noise as well as the desired signal. On the other hand, when the operation mode of the FSK digital signal receiving apparatus 10 is in the signal-receiving standby state, the ambient noise is inputted to the antenna 11.

The first frequency-converting portion 12 converts a frequency of a signal emitted from the antenna 11 and generates an intermediate-frequency signal to be outputted to the A/D converting portion 13. The A/D converting portion 13 converts the intermediate-frequency signal outputted by the first frequency-converting portion 12 from an analog form to a digital form and generates a discrete digital signal. Then, the A/D converting portion 13 outputs the discrete digital signal to the second frequency-converting portion 14.

The second frequency-converting portion 14 converts a frequency of the discrete digital signal outputted by the A/D converting portion 13 and generates a base band signal to be outputted to the frequency band-limiting portion 15. The frequency band-limiting portion 15 limits a frequency band of the base band signal outputted by the second frequency-converting portion 14 and generates a bandlimited signal. Then, the frequency band-limiting portion 15 outputs the bandlimited signal to the adaptive noise-filtering unit 16 as a received signal X (serving as a signal X, which at least includes the ambient noise as a noise signal.

The adaptive noise-filtering unit 16 is configured with an adaptive filter 21, two signal-processing portions 22 and 23 each of which includes a configuration being identical to one another, an electric power-calculating portion 24, and an electric power-judging unit 25.

The adaptive filter 21 includes an adaptive filtering portion 21a and a filter coefficient-updating portion 21b. In the adaptive filtering portion 21a, a filtering coefficient is variable in response to a change in the received signal X. The filter coefficient-updating portion 21b sequentially updates the filter coefficient of the adaptive filtering portion 21a so as to remove, or filter out, a correlated noise (serving as a correlated ambient noise) from the received signal X when the FSK digital signal receiving apparatus 10 is in the signal-receiving standby state. The adaptive filter 21 includes an adaptive mode for filtering the correlated noise from the received signal X by use of the filter coefficient which is sequentially updated.

In the adaptive noise-filtering unit 16, the received signal X transmitted by the frequency band-limiting portion 15 may be outputted to the adaptive filtering portion 21a via a delaying portion 21c so as to generate a signal. The received signal X and the signal generated via the delaying portion 21c are outputted to an error calculating portion 21d, so that an error signal of the received signal X and the signal generated via the delaying portion 21c is obtained or extracted by the error calculating portion 21d. The error calculating portion 21d outputs the error signal as an interfering-wave filtered signal e. The interfering-wave filtered signal e is a signal from which the correlated noise is filtered from the ambient noise inputted with the received signal X. In addition, when the FSK digital signal receiving apparatus 10 is in the signal-receiving standby state, the adaptive filter 21 outputs the interfering-wave filtered signal e to the filter coefficient-updating portion 21b in addition to the received signal X thereby optimizing a characteristic of the adaptive filtering portion 16a (i.e., the adaptive filter 21 is set to the adaptive mode).

The adaptive filter 21 outputs, to one signal-processing portion 22, the interfering-wave filtered signal e (extracted signal) which is extracted by removing or filtering out a stable interfering-wave corresponding to a current operation condition, such as the correlated noise, from the received signal X. The signal-processing portion 22 is inputted with the interfering-wave filtered signal e and calculates an autocorrelation. Then, the signal-processing portion 22 outputs the interfering-wave filtered signal e to the adaptive filter-controlling unit 17 as a correlation signal $X1(t)$.

In addition, the adaptive noise-filtering portion 16 outputs the received signal X outputted from the frequency band-limiting portion 15 the same to the other signal-processing portion 23, i.e., the adaptive noise-filtering portion 16 outputs the received signal X bypassing the adaptive filter 21. The signal-processing portion 23 is inputted with the received signal X outputted from the frequency band-limiting portion 15 and calculates an autocorrelation. Then, the signal-processing portion 23 outputs the received signal X to the adaptive filter-controlling unit 17 as a correlation signal X2(t).

The electric power-calculating portion 24 is inputted with the received signal X outputted from the frequency band-limiting portion 15 and generates an electric power signal X(t) representing the electric power of the received signal X. Then, the electric power-calculating portion 24 outputs the electric power signal X(t) to the electric power-judging unit 25.

The electric power-judging unit 25 includes a first electric power portion 25a serving as a holding portion, a second electric power portion 25b serving as a calculating portion, and a comparator 25c serving as a comparing portion.

The first electric power portion 25a is inputted with the electric signal X(t) and calculates a first smoothed electric power Pb(t), which serves as a first electric power for the received signal X (serving as a signal received before a detection of a new signal, which will be described later) and is obtained by smoothing the first electric power (the electric power signal X(t)), on the basis of an equation (1) described hereinafter. Then, the first electric power portion 25a holds the first smoothed electric power Pb(t).

$$Pb(t)=(1-\mu)Pb(t-1)+\mu X(t) \quad (1)$$

Here, $\mu$ is a smoothed coefficient.

The first electric power portion 25a is further inputted with the detection signal as well as the electric power signal X(t). The detection signal is outputted from a detecting portion 31, which will be described later, when the new signal is detected by the detecting portion 31. After a detection of the new signal, the first electric power portion 25a stops updating the first smoothed electric power Pb(t). In other words, the first electric power portion 25a holds the first smoothed electric power Pb(t), which is calculated just before the new signal is detected, after the detection of the new signal.

On the other hand, the second electric power portion 25b is inputted with the detection signal as well as the electric power signal X(t). Then, after the detection signal is inputted, i.e., after the detection of the new signal, the second electric power portion 25b calculates a second smoothed electric power Pa(t) on the basis of an equation (2) described hereinafter utilizing a predetermined time starting from the detection of the new signal. The second smoothed electric power Pa(t) serves as a second electric power for the received signal X (serving as a signal received after the detection of the new signal) and is obtained by smoothing the second electric power (electric power signal X(t)), on the basis of an equation (2). Then, the second electric power portion 25b holds the second smoothed electric power Pa(t). The predetermined time required for calculating the second smoothed electric power Pa(t) is set as a time being preferable for absorbing a temporal change of the electric power signal X(t).

$$Pa(t)=(1-\mu)Pa(t-1)+\mu X(t) \quad (2)$$

The comparator 25c is inputted with the first and second smoothed electric power Pb(t), Pa(t) and with the detection signal. After passing the predetermined time after the detection of the new signal, i.e., after completing calculating the second smoothed electric power Pa(t), the comparator 25c compares a level of the first smoothed electric power Pb(t) with a level of the second smoothed electric power Pa(t). Then, the comparator 25c outputs a selecting signal to the adaptive filter-controlling unit 17. The selecting signal represents a result of a comparison of the levels of the first and second smoothed electric powers Pb(t) and Pa(t).

The adaptive filter-controlling unit 17 is configured to include the detecting portion 31, a selector 32, a demodulating portion 33 and a filter-controlling portion 34.

The detecting portion 31 is inputted with the correlation signal X1(t) from the signal-processing portion 22. Then, the detecting portion 31 detects the new signal on the basis of the correlation signal X1(t) (serving as a signal from which the correlated ambient noise is filtered out by the adaptive filter 21) by monitoring a remarkable change of the correlation signal X1(t) and generates the detection signal which represents a detection of the new signal. Then, the detecting portion 31 outputs the detection signal to the electric power-judging unit 25 (i.e., to the first electric power portion 25a, the second electric power portion 25b and the comparator 25c), the filter-controlling portion 34 and to an outer circuit which is not illustrated in the drawings.

The selector 32 is inputted with the correlation signals X1(t) and X2(t), which are respectively outputted from the signal-processing portions 22 and 23, and with the selecting signal outputted from the electric power-judging unit 25 (i.e., from the comparator 25c). Then, the selector 32 selects either of the correlation signal X1(t) (serving as the signal from which the correlated ambient noise is filtered out by the adaptive filter 21) or the correlation signal X2(t) (serving as the signal bypassing the adaptive filter 21) in response to the selecting signal and outputs, to the demodulating portion 33, a selected correlation signal Y(t) selected from the correlation signal X1(t) or X2(t). More specifically, when the selector 32 is inputted with the selecting signal representing that the first smoothed electric power Pb(t) is larger than the second smoothed electric power Pa(t), the selector 32 outputs the correlation signal X1(t), based on the received signal X from which the correlated ambient noise is removed by the adaptive filter 21, as the selected correlation signal Y(t). On the other hand, when the selector 32 is inputted with the selecting signal representing that the first smoothed electric power Pb(t) is equal to, or smaller than, the second smoothed electric power Pa(t), the selector 32 outputs the correlation signal X2(t), which is based on the received signal X without passing through the adaptive filter 21, as the selected correlation signal Y(t). The demodulating portion 33 generates a demodulated signal on the basis of the selected correlation signal Y(t) (serving as a signal selected by the selecting portion) selected by the selector 32 from the correlation signal X1(t) or X2(t). Then, the demodulating portion 33 outputs the demodulated signal to the filter-controlling portion 34 and to the outer circuit which is not illustrated.

The filter-controlling portion 34 is inputted with the detection signal from the detecting portion 31 and with the demodulated signal from the demodulating portion 33. Then, the filter-controlling portion 34 outputs a filter-controlling signal to the adaptive filter 21 (i.e., to the filter coefficient-updating portion 21b) and controls the adaptive filter 21. More specifically, after the new signal is detected, the filter-controlling portion 34 judges a characteristic of the new signal during reception on the basis of the demodulated signal and stops the filter coefficient from being updated at the filter coefficient updating portion 21b when the new signal during the reception indicates a characteristic of the desired signal (i.e., the adaptive filer 21 is set as a non-adaptive mode). In the mean time, a last filter coefficient, which is updated just before the update of the filter coefficient is stopped, is held in the adaptive filtering portion 21a of the adaptive filter portion 21. Accordingly, in the signal-receiving state for receiving the desired signal, the adaptive filter 21 outputs, to the signal-processing portion 22, the extracted signal (interfering-wave filtered signal e) which is extracted by filtering the stable interfering-wave corresponding to the signal-receiving standby condition, such as a correlated noise, from the received signal X.

After the detection of the new signal, in a case where the new signal during the reception does not indicate, or is different from, the characteristic of the desired signal, i.e., in a case where the signal during the reception indicates a characteristic of the interfering wave, the filter controlling portion 34 maintains or switches the adaptive filter 21 to the adaptive mode. In the mean time, the update of the filter coefficient is continued or restarted at the adaptive filter 21. In other words, the adaptive filter 21 is normally set as the adaptive mode, and when the new signal during the reception indicates the characteristic of the desired signal, the adaptive filter is set as the non-adaptive mode.

Next, operations of the FSK digital signal receiving apparatus according to the embodiment will be described hereinafter.

At first, the signal during the reception is assigned as the interfering-wave and the adaptive filter 21 is set as the adaptive mode. Further, the selector 32 is assigned to output the correlation signal X1($t$) based on the received signal X from which the correlated ambient noise is removed by the adaptive filter 21. In such condition, when an interfering-wave having a frequency being identical to that of the desired signal (for example, one of two waves of a carrier wave assigned to each digital value of the desired signal) is inputted, the filter coefficient is updated at the adaptive filter 21 so as to filter the correlated ambient noise including the above described frequency from the received signal X. Accordingly, after the new signal is detected in response to receiving the desired signal, the desired signal and the correlated ambient noise, both which include the above-described frequency, are filtered out from the received signal. In the above condition, at the reception of the desired signal, a signal component, which includes the other of the two frequency of the carrier wave assigned to each digital value, is mainly utilized for detecting the new signal.

Here, in a case where the first smoothed electric power Pb(t) corresponding to the first electric power of the received signal X before the detection of the new signal, is equal to or smaller than the electric power of the received signal X after the detection of the new signal, i.e., the first smoothed electric power Pb(t) is equal to or smaller than the second smoothed electric power Pa(t) corresponding to the electric power of the received signal X considered to include the desired signal, the correlation signal X2($t$), which is based on the received signal X without passing the adaptive filter 21, is selected by the selector 32 as the selected correlation signal Y(t). Accordingly, the desired signal is precisely demodulated at the demodulating portion 33 by the correlation signal X2($t$), i.e., by the correlation signal X2($t$) based on the received signal X where the desired signal is not filtered out nor reduced and includes the electric power larger than the interfering wave.

Then, after the new signal is detected, when the filter-controlling portion judges that the new signal during the reception represents the characteristic of the desired signal, the filter-controlling portion 34 switches the mode of the adaptive filter 21 to the non-adaptive mode. Therefore, the update of the filter coefficient in the adaptive filter 21 is stopped, and the filter coefficient is prevented from continuing to be updated so as not to filter the new signal during the reception (herein, the desired signal) as the ambient noise at the adaptive filter 21.

On the other hand, after the detection of the new signal, when the filter-controlling portion 34 judges that the new signal during the reception does not indicate the characteristic of the desired signal, i.e., the signal during the reception represents the characteristic of the interfering wave, the filter-controlling portion 34 maintains or switches the mode of the adaptive filter 21 to the adaptive mode. Therefore, the filter coefficient is continued or restarted to be updated at the adaptive filter 21, and the new signal during the reception (i.e., the interfering wave) is preferably filtered as the correlated ambient noise at the adaptive filter 21.

Figure 2:
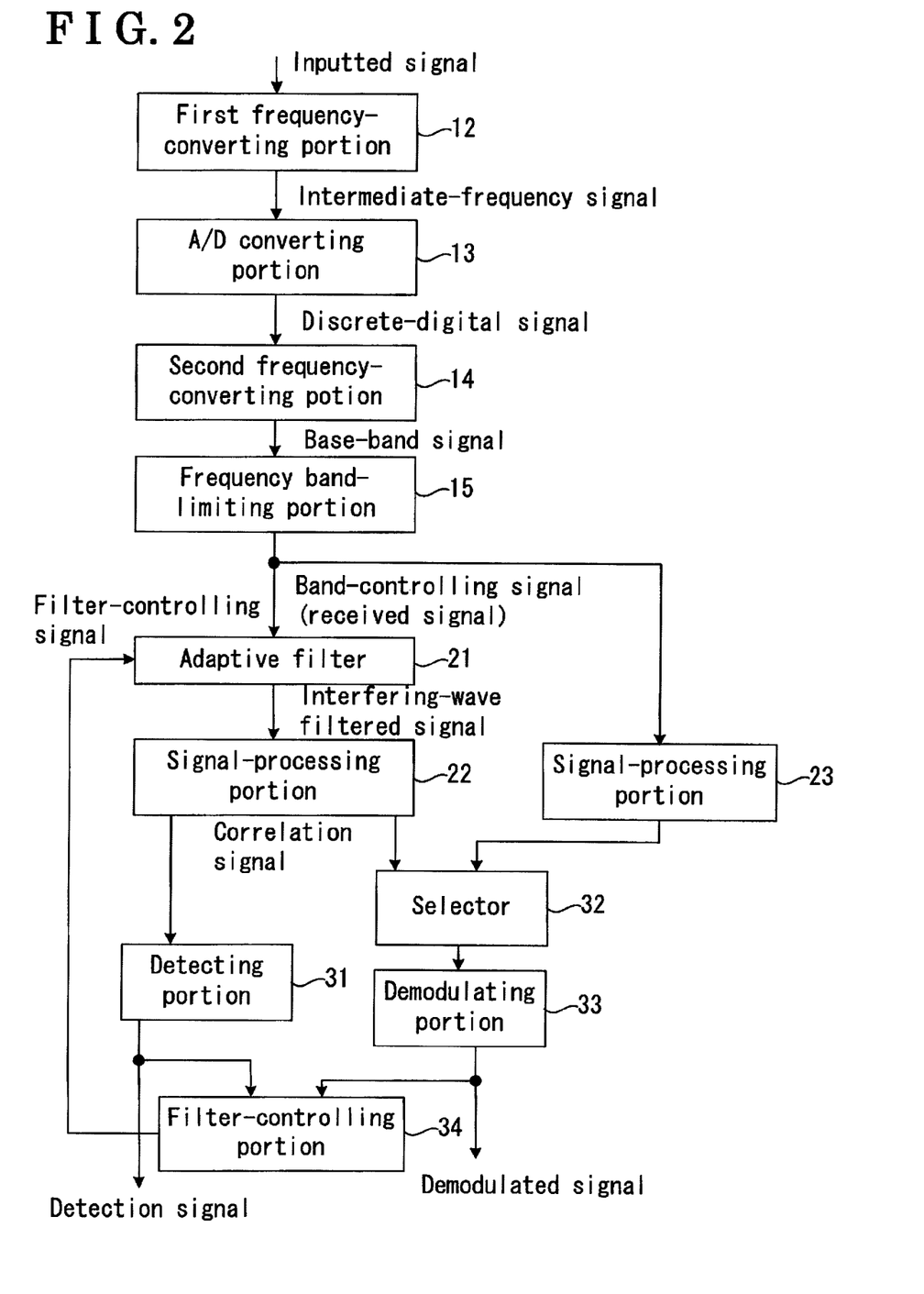
FIG. 2 is a schematic block diagram illustrating a flowchart of signal processing according to the embodiment.

Next, a signal-processing manner of the embodiment will be inclusively described hereinafter with reference to a schematic block diagram of FIG. 2 and the system block diagram of FIG. 1. As illustrated therein, a signal (inputted signal) inputted to the digital signal receiving apparatus 10 via the antenna 11 is outputted as the intermediate-frequency signal by the first frequency-converting portion 12. Then, the intermediate-frequency signal is outputted as the discrete-digital signal by the A/D converting portion 13. Further, the discrete-digital signal is outputted as the base-band signal by the second frequency-converting portion 14. Still further, the base-band signal is outputted as the band-controlling signal (received signal X) by the frequency band-limiting portion 15. The band-controlling signal is generated or extracted as the interfering-wave filtered signal e by the adaptive noise-filtering portion 16.

Next, the interfering-wave filtered signal e is outputted as the correlation signal X1($t$) by the signal-processing portion 22 which calculates the autocorrelation. The correlation signal X1($t$) is outputted as the detection signal by the detecting portion 31 which detects the new signal from the correlation signal X1($t$). On the other hand, the band-controlling signal is outputted as the correlation signal X2($t$) by the signal-processing portion 23 which calculates the autocorrelation.

Further, either of the correlation signals X1($t$) or X(2($t$) is selected by the selector 32 as the selected correlation signal Y(t) on the basis of the selecting signal outputted from the electric power-judging unit 25. The selected correlation signal Y(t) selected from the correlation signals X1($t$), X2($t$) and outputted from the selector 32 is inputted to the demodulating portion 33, which demodulates the desired signal from the correlation signal Y(t). Then, the selected correlation signal Y(t) is outputted from the demodulating portion 33 as the demodulated signal. The demodulated signal and the detection signal are outputted to the filter-controlling portion 34 and then, the filter-controlling signal is generated by the filter-controlling portion 34. Further then, the filter-controlling signal is outputted to the adaptive filter 21 hence the adaptive filter 21 (adaptive filtering portion 21a) is stably controlled.

As described above in detail, according to the embodiment of the present invention, effects described hereinafter may be obtained.

(1) According to the embodiment, in a case where the interfering wave having the frequency identical to the frequency of the desired signal is inputted before the new signal is detected, the filter coefficient of the adaptive filter 21 is sequentially updated so that the correlated ambient noise with the above described frequency is filtered out from the received signal X. Accordingly, after the new signal is detected in accordance with the reception of the desired signal, both the desired signal and the correlated ambient noise, both which have the above-described frequency, are filtered out from the received signal X by the adaptive filter 21. However, when the first smoothed electric power Pb(t) corresponding to the first electric power of the received signal before the new signal is detected, is equal to or smaller than the second smoothed electric power Pa(t) corresponding to the second electric power of the received signal X after the detection of the new signal, i.e., the electric power which is presumed to include the desired signal, the received signal (the selected correlation signal Y(t)) without passing through, the adaptive filter 21 is selected by the selector 32 (i.e., the correlation signal X2(t) is selected). Then, the desired signal is precisely demodulated at the demodulating portion on the basis of the received signal without passing through the adaptive filter, i.e., the received signal (correlation signal X2(t)) from which the desired signal is not filtered out nor reduced and includes the electric power larger than the interfering wave.

(2) According to the embodiment of the present invention, the first and second electric power of which levels are compared by the comparator 25c, i.e., both first and second electric power relating the selection of the received signal (correlation signals X1(t), X2(t)) by the selector 32, are the first and second smoothed electric power Pb(t) and Pa(t), respectively. Accordingly, even when the electric power of the received signal X is temporary changed, the selection of the received signal by the selector 32 may be less influenced and thus leading to demodulating the desired signal more precisely.

(3) Further according to the embodiment of the present invention, when the received signal (correlation signals X1(t) and X2(t)) demodulated by the demodulating portion 33 after the detection of the new signal indicates the characteristic of the desired signal, the adaptive filter 21 is set as the non-adaptive mode by the filter-controlling portion 34 and the desired signal is reflected to the filter coefficient of the adaptive filter 21. Therefore, the desired signal is prevented from being filtered out as the ambient noise. In other words, the desired signal is prevented from being filtered out as the correlated ambient noise by the adaptive filter 21. On the other hand, in a case where the received signal demodulated by the demodulating portion 33 does not indicate the characteristic of the desired signal after the detection of the new signal, the adaptive filter 21 is set to the adaptive mode by the filter-controlling portion 34. Therefore, the new signal (such as the interfering wave) during the reception is reflected to the filter coefficient. Accordingly, the new signal during the reception is preferably filtered as the correlated ambient noise by the adaptive filter 21.

(4) When the adaptive filter 21 is in the non-adaptive mode, the adaptive filter 21 filters the ambient noise utilizing the filter coefficient which is updated to filter out the correlated ambient noise at the adaptive mode. Accordingly, when the digital signal receiving apparatus 10 is in the signal-receiving state for receiving the desired signal, the correlated ambient noise is filtered out even when the ambient noise and the desired noise are correlated to one another, and the desired signal is preferably received. In addition, even when the ambient noise and the desired noise are correlated to one another, the filter-controlling portion 34 controls the switching of the operation mode of the adaptive filter 21 between the adaptive mode and the non-adaptive mode. Therefore, the desired signal and the ambient noise are selectively received and a size of the circuit may be reduced in comparison with a case where a circuit, in which the ambient noise and the desired signal are separately received, is employed, for example. For example, the antenna for receiving the noise signal and the circuit for outputting the reference noise signal, as described in the reference 1, may be omitted.

(5) According to an analog signal receiving apparatus, for example, when the interfering wave exists in a band area, a desired wave is required to be larger than the interfering wave. In other words, when the interfering wave (noise) in the band area is larger than the desired wave (ASK signal), the FSK signal may not be demodulated. According to the embodiment of the present invention, however, the digital signal receiving apparatus is employed hence the FSK signal can be demodulated even when a noise larger than the FSK signal exists.

In addition, the embodiment described above may be modified as will be described hereinafter.

According to the above-described embodiment, the first and second electric powers of the received signal X, the electric powers of which levels are compared by the comparator 25c, i.e., the both electric powers relating to the selection of the received signal (correlation signal X1(t), X2(t)) by the selector 32, may be an electric power Pb(t)+α corresponding to the first smoothed electric power Pb (t) increased by a predetermined value α(>0) and the second smoothed electric power Pa(t), respectively. In such a case, at the selection of the received signal by the selector 32, the level of the electric power (Pb(t)+α) corresponding to the first smoothed electric power Pb(t) increased by the predetermined value α and the level of the second smoothed electric power Pa(t) are compared. Then, when the second smoothed electric power Pa(t) is larger to some extent than the first smoothed electric power Pb(t), i.e. when the electric power of the desired signal is to some extent larger than the electric power of the interfering wave, the received signal without passing the adaptive filter 21 is selected. Accordingly, the desired signal is precisely demodulated on the basis of the received signal without passing the adaptive filter 21.

According to the above-described embodiment of the present invention, at the time when the new signal is detected by the detecting portion 31, the adaptive filter 21 may be switched from the adaptive mode to the non-adaptive mode by the filter-controlling portion 34. In such a case, the update of the filter coefficient is speedily stopped by the filter-controlling portion 34 without waiting for a judgment whether the signal during the reception is the ambient noise or the desired signal. Accordingly, the desired signal is reflected to the filter coefficient as the correlated ambient noise while the new signal during the reception is assumed to be the desired signal, and the desired signal is controlled from being filtered after the new signal during the reception is assumed to be the desired signal.

In addition, after the detection of the new signal, whether or not the signal during the reception represents the characteristic of the desired signal is judged by the filter-controlling portion 34 on the basis of the demodulated signal. Accordingly, it is preferable to maintain the adaptive filter 21 to the non-adaptive mode when the signal during the reception represents the characteristic of the desired signal, while it is further preferable to switch the adaptive filter from the non-adaptive mode to the adaptive mode by the filter-controlling portion 34 when the signal during the reception does not represent the characteristic of the desired signal.

Still further according to the above-described embodiment of the present invention, an adaptive noise-filtering portion for filtering out an uncorrelated ambient noise may be separately provided.

The digital signal receiving apparatus according to the present invention is applicable to a vehicle, which is not especially mentioned in the embodiment described above. In this case, the digital signal receiving apparatus may be operatively associated with a radio communication having a transmitter carried by a user, so that an electronically driven locking and unlocking of a door of the vehicle, an engine start or an engine stop is confirmed. Further, the digital signal receiving apparatus may be operatively associated with a radio communication with a transmitter carried by a user, so that actuations of electric apparatuses, such as a power window apparatus, a slide door apparatus, a sun roof apparatus are controlled. That is, the digital signal receiving apparatus can be applicable to systems in which a non-communication state (signal-receiving standby state) of a desired signal exists.

According to an aspect of the present invention, a frequency shift keying (FSK) digital signal receiving apparatus includes an adaptive filter, a detecting portion, a holding portion, a calculating portion, a comparing portion, a selecting portion, and a demodulating portion. The adaptive filter receives a signal and includes an adaptive mode for filtering out a correlated ambient noise from the signal by use of a filter coefficient updated in a sequential manner. The detecting portion detects a new signal on the basis of the signal, from which the correlated ambient noise is filtered out by the adaptive filter. The holding portion holds a first electric power for the signal received before a detection of the new signal. The calculating portion calculates a second electric power for the signal received after the detection of the new signal. The comparing portion compares a level of the first electric power with a level of the second electric power. The selecting portion selects the signal from which the correlated ambient noise is filtered out by the adaptive filter, when the first electric power is higher than the second electric power. The selecting portion selects the signal bypassing the adaptive filter when the first electric power is lower than the second electric power. The demodulating portion demodulates a desired signal on the basis of the signal selected by the selecting portion.

According to the above-described structure, in a case where an interfering wave having a frequency being identical to that of the desired signal is inputted before the detection of the new signal, the filter coefficient of the adaptive filter is updated so as to filter out the correlated ambient noise including the above-described frequency from the received signal. Accordingly, after the detection of the new signal in accordance with a reception of the desired signal, both the desired signal and the correlated ambient noise, both which include the above-described frequency, are filtered out from the received signal by the adaptive filter. However, when the first smoothed electric power corresponding to the first electric power of the received signal before the detection of the new signal is equal to or smaller than the second smoothed electric power corresponding to the second electric power of the received signal after the detection of the new signal, i.e., the electric power which is presumed to include the desired signal, the received signal without passing through the adaptive filter is selected by the selecting portion. Then, the desired signal is precisely demodulated at the demodulating portion on the basis of the received signal without passing through the adaptive filter, i.e., the received signal from which the desired signal is not filtered out nor reduced and includes the electric power larger than the interfering wave.

Further according to an aspect of the present invention, the frequency shift keying digital signal receiving apparatus is characterized in that the first electric power for the signal includes a first smoothed electric power obtained by smoothing the first electric power for the signal received before the detection of the new signal, and the second electric power includes a second smoothed electric power obtained by smoothing the second electric power for the signal received after the detection of the new signal.

Due to the structure described above, the first and second electric power of which levels are compared by the comparing portion, i.e., both first and second electric power relating a selection of the signal selected by the selecting portion, are obtained by smoothing the first and second smoothed electric power, respectively. Accordingly, even when an electric power of the signal is temporary changed, the selection of the signal by the selecting portion may be less influenced and thus leading to demodulating the desired signal more precisely.

Still further an aspect of the present invention, the frequency shi keying digital signal receiving apparatus is characterized in that the comparing portion compares a level of the first electric power increased by a predetermined value with the level of the second electric power. Further, the selecting portion selects either the signal, from which the ambient noise is filtered out by the adaptive filter, or the signal bypassing the adaptive filter in response to a result of the comparing portion.

Due to the structure described above, at the selection of the signal by the selecting portion, the level of the electric power increased by a predetermined value is compared with the level of the second electric power and then, when the second electric power is larger to some extent than the first electric power, i.e. when the electric power of the desired signal is to some extent larger than the electric power of an interfering wave, the signal without passing the adaptive filter is selected. Accordingly, the desired signal is precisely demodulated on the basis of the received signal without passing the adaptive filter.

Still further according to the aspect of the present invention, the frequency shift keying digital signal receiving apparatus is further characterized in that the adaptive filter includes a non-adaptive mode for stopping an update of the filter coefficient and filtering out the correlated ambient noise from the signal by use of the filter coefficient updated in the adaptive mode. In addition, the frequency shift keying digital signal receiving apparatus further includes a filter-controlling portion setting the adaptive filter to the non-adaptive mode when the signal demodulated by the demodulating portion indicates a characteristic of the desired signal after the detection of the new signal, and setting the adaptive filter to the adaptive mode when the characteristic of the signal is different from the characteristic of the desired signal.

Due to the structure described above, when the signal demodulated by the demodulating portion after the detection of the new signal indicates the characteristic of the desired signal, the adaptive filter is set as the non-adaptive mode by the filter-controlling portion and the desired signal is reflected to the filter coefficient of the adaptive filter. Therefore, the desired signal is prevented from being filtered out as the ambient noise. In other words, the desired signal is prevented from being filtered out as the correlated ambient noise by the adaptive filter. On the other hand, in a case where the received signal demodulated by the demodulating portion does not indicate the characteristic of the desired signal after the detection of the new signal, the adaptive filter is set to the adaptive mode by the filter-controlling portion. Therefore, the new signal (such as the interfering wave) during the reception is reflected to the filter coefficient. Accordingly, the new signal during the reception is preferably filtered as the correlated ambient noise by the adaptive filter.

The invention claimed is:

1. A frequency shift keying digital signal receiving apparatus comprising:
    an adaptive filter receiving a signal and having an adaptive mode for filtering out a correlated ambient noise from the signal by use of a filter coefficient updated in a sequential manner;
    a detecting portion detecting a new signal on the basis of the signal, from which the correlated ambient noise is filtered out by the adaptive filter;
    a holding portion holding a first electric power for the signal received before a detection of the new signal;

a calculating portion calculating a second electric power for the signal received after the detection of the new signal;

a comparing portion comparing a level of the first electric power with a level of the second electric power;

a selecting portion selecting the signal, from which the correlated ambient noise is filtered out by the adaptive filter, when the first electric power is greater than the second electric power and selecting the signal bypassing the adaptive filter when the first electric power is equal to or lower than the second electric power; and a demodulating portion demodulating a desire signal on the basis of the signal selected by the selecting portion;

wherein the first electric power for the signal includes a first smoothed electric power obtained by smoothing the first electric power for the signal received before the detection of the new signal, and the second electric power includes a second smoothed electric power obtained by smoothing the second electric power for the signal received after the detection of the new signal.

2. A frequency shift keying signal receiving apparatus according to claim 1, wherein the comparing portion compares a level of the first electric power increased by a predetermined value with the level of the second electric power, and the selecting portion selects either the signal, from which the ambient noise is filtered out by the adaptive filter, or the signal bypassing the adaptive filter in response to a result of the comparing portion.

3. A frequency shift keying digital signal receiving apparatus according to claim 1, wherein the adaptive filter includes a non-adaptive mode for stopping and update of the filter coefficient and filtering out the correlated ambient noise from the signal by use of the filter coefficient updated in the adaptive ode, and wherein the frequency shift keying digital signal receiving apparatus further comprises a filter-controlling portion setting the adaptive filter to the non-adaptive mode when the signal demodulated by the demodulating portion indicates a characteristic of the desired signal after the detection of the new signal, and setting the adaptive filter to the adaptive mode when the characteristic of the signal is different from the characteristic of the desired signal.

* * * * *